United States Patent
Liu et al.

(10) Patent No.: US 8,639,198 B2
(45) Date of Patent: Jan. 28, 2014

(54) SYSTEMS AND METHODS FOR 8-TX CODEBOOK AND FEEDBACK SIGNALING IN 3GPP WIRELESS NETWORKS

(75) Inventors: Lingjia Liu, Allen, TX (US); Jianzhong Zhang, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 43 days.

(21) Appl. No.: 13/170,964

(22) Filed: Jun. 28, 2011

(65) Prior Publication Data

US 2012/0003945 A1    Jan. 5, 2012

Related U.S. Application Data (60) Provisional application No. 61/360,376, filed on Jun. 30, 2010.

(51) Int. Cl.
*H03C 1/62* (2006.01)
*H04B 17/00* (2006.01)

(52) U.S. Cl.
USPC ............ 455/115.1; 455/67.11; 375/295

(58) Field of Classification Search
USPC ............ 455/115.1, 67.11; 375/295–296
See application file for complete search history.

(56) References Cited

U.S. PATENT DOCUMENTS

| | | | |
|---|---|---|---|
| 2008/0305745 A1* | 12/2008 | Zhang et al. | 455/67.11 |
| 2009/0109873 A1 | 4/2009 | Shen et al. | |
| 2010/0322176 A1 | 12/2010 | Chen et al. | |
| 2011/0200131 A1* | 8/2011 | Gao et al. | 375/267 |

FOREIGN PATENT DOCUMENTS

EP        2194740        6/2010

OTHER PUBLICATIONS

3GPP TS 36.211 V9.1.0, "Physical Channels and Modulation (Release 9)", Mar. 2010, 85 pages.
International Search Report dated Jan. 2, 2012 in connection with International Patent Application No. PCT/KR2011/004802.

* cited by examiner

*Primary Examiner* — Christian Hannon (57) ABSTRACT

A mobile station for use in a wireless network. The mobile station is operable to transmit feedback values to a base station of the wireless network. The feedback values include a first precoder matrix indicator (PMI1) value and a second precoder matrix indicator (PMI2) value. The mobile station transmits the PMI2 value to the base station in the same subframe as a channel quality indicator (CQI) value. The CQI value may be either a wideband CQI value or a subband CQI value.

12 Claims, 5 Drawing Sheets

| FEEDBACK CONFIGURATION FOR PUCCH | | | | |
|---|---|---|---|---|
| PUCCH FEEDBACK MODES | REL-8 CORRESPONDING FEEDBACK MODE | RI | PMI1 | PMI2 |
| FEEDBACK MODE 1: TARGETING WIDEBAND FEEDBACK | PUCCH FEEDBACK MODE 1-1 | SEPARATE CODING (3-BIT RI) | | |
| FEEDBACK MODE 2: TARGETING SUBBAND FEEDBACK | PUCCH FEEDBACK MODE 2-1 | JOINT CODING (5-BIT JOINT PMI1 AND RI) | | |

SYSTEMS AND METHODS FOR 8-TX CODEBOOK AND FEEDBACK SIGNALING IN 3GPP WIRELESS NETWORKS

CROSS-REFERENCE TO RELATED APPLICATION(S) AND CLAIM OF PRIORITY

The present application is related to U.S. Provisional Patent Application No. 61/360,376, filed Jun. 30, 2010, entitled "8 TX CODEBOOK DESIGN AND FEEDBACK SIGNALING DESIGN IN REL-10". Provisional Patent Application No. 61/360,376 is assigned to the assignee of the present application and is hereby incorporated by reference into the present application as if fully set forth herein. The present application hereby claims priority under 35 U.S.C. §119(e) to U.S. Provisional Patent Application No. 61/360,376.

TECHNICAL FIELD OF THE INVENTION

The present application relates generally to wireless networks and, more specifically, to the CQI, PMI, and RI feedback mechanism for the physical uplink control channel (PUCCH) in Release 10 of 3GPP wireless networks.

BACKGROUND OF THE INVENTION

In $3^{RD}$ Generation Partnership Project Long Term Evolution (3GPP LTE), Orthogonal Frequency Division Multiplexing (OFDM) is adopted as a downlink (DL) transmission scheme.

The 3GPP LTE (Long Term Evolution) standard is the last stage in the realization of true 4th generation (4G) mobile telephone networks. Most major mobile carriers in the United States and several worldwide carriers have announced plans to convert their networks to LTE beginning in 2009. LTE is a set of enhancements to the Universal Mobile Telecommunications System (UMTS). Much of 3GPP Release 8 focuses on adopting 4G mobile communications technology, including an all-IP flat networking architecture.

The 3GPP LTE standard uses orthogonal frequency division multiplexing (OFDM) for the downlink (i.e., from the base station to the mobile station). Orthogonal frequency division multiplexing (OFDM) is a multi-carrier transmission technique that transmits on many orthogonal frequencies (or subcarriers). The orthogonal subcarriers are individually modulated and separated in frequency such that they do not interfere with one another. This provides high spectral efficiency and resistance to multipath effects.

The following documents and standards descriptions are hereby incorporated into the present disclosure as if fully set forth herein: 1) Document No. R1-101683, "Way Forward For Rel-10 Feedback Framework", February 2010; 2) Document No. R1-102579, "Way Forward On Release 10 Feedback", RAN WG1, April 2010; 3) Document No. RI-103419, "Way Forward on CSI Feedback Design For Rel-10 LD MIMO", May 2010; 4) Document No. R1-103332, "Way Forward On UE Feedback", May 2010; 5) Document No. R1-103333, "Refinements of Feedback And Codebook Design", May 2010; 6) Document No. R1-103805, "Double Codebook Performance Evaluation", June 2010; 7) Document No. RI-103701, "8Tx Codebook Design", June 2010; and 8) 3GPP Technical Specification No. 36.211.

In Release 10 LTE systems, a mobile station (or user equipment) performs feedback of precoder matrix index (PMI), rank indicator (RI), and channel quality indicator (CQI) to the base station (or eNodeB). In the 3GPP RAN#60 meeting, a way forward on feedback in Release 10 was agreed upon. Release 10 uses implicit feedback of precoder matrix index (PMI), rank indicator (RI), and channel quality indicator (CQI). The user equipment (UE) or mobile station (MS) spatial feedback for a subband represents a precoder and CQI is computed based on the assumption that the eNodeB or base station (BS) uses a specific precoder (or precoders), as given by the feedback, on each subband within the CQI reference resource. It is noted that a subband may correspond to the whole system bandwidth.

A precoder for a subband is composed of two matrices. The precoder structure is applied to all transmit (Tx) antenna array configurations. Each of the two matrices belongs to a separate codebook. The codebooks are known (or synchronized) at both the base station (eNodeB) and the mobile station (user equipment). Codebooks may or may not change over time for different subbands. The two codebook indices together determine the precoder. One of the two matrices targets the wideband or long-term channel properties. The other matrix targets the frequency-selective or short-term channel properties. It is noted that a matrix codebook in this context should be interpreted as a finite, enumerated set of matrices that, for each resource block (RB), is known to both the mobile station (or UE) and the base station (or eNodeB). It is also noted that that a Release 8 precoder feedback may be deemed a special case of this structure.

Two messages are conveyed in this way: 1) Release 10 feedback will be based on implicit feedback similar to Release 8 feedback; and 2) two codebook indices will specify a precoder in Release 10, with one codebook targeting wideband and/or long-term channel properties and the other codebook targeting frequency-selective and/or short-term channel properties.

In the RAN1 #60bis meeting, another way forward on mobile station (or UE) feedback in Release 10 was also agreed upon. A precoder, W, for a subband is a function of two matrices, W1 and W2, (i.e., where W1∈C1 and W2∈C2). W1 is also referred to as a first PMI, and W2 is also referred to as a second PMI in this disclosure. The codebooks C1 and C2 are codebook 1 and codebook 2, respectively. The first PMI targets wideband (or long-term) channel properties. The second PMI targets frequency-selective (or short-term) channel properties. For the physical uplink control channel (PUCCH), the feedback corresponding to the first PMI and the second PMI may be sent in different or the same subframe, unless the payload is too large to send the first PMI and the second PMI in the same subframe on PUCCH. Also, periodic and aperiodic reports are independent.

Thus, there is an important difference in feedback between Release 8 (Rel-8) and Release 10 (Rel-10) of 3GPP networks. In Release 8, only one codebook index specifies a precoder. However, in Release 10, two codebook indices specify a precoder. Furthermore, these two codebook indices in Release 10 may be sent in different subframes or in the same subframe.

Therefore, there is a need in the art for improved devices and methods for providing feedback information related to CQI, PMI, and RI in Rel-10 wireless networks. In particular, there is a need in the art for improved, efficient methods and apparatuses to reduce Rel-10 feedback overhead to a level similar to Rel-8 feedback overhead.

SUMMARY OF THE INVENTION

To address the above-discussed deficiencies of the prior art, it is a primary object to provide, for use in a wireless network, a mobile station operable to transmit feedback values to a base station of the wireless network. The feedback values include a first precoder matrix indicator (PMI1) value and a second precoder matrix indicator (PMI2) value. The mobile station transmits the PMI2 value to the base station in the same subframe as a channel quality indicator (CQI) value.

A method of operating a mobile station is provided. The method includes transmitting feedback values to a base station of a wireless network. The method comprises the steps of: i) measuring a channel between the base station and the mobile station; ii) determining feedback values including a first precoder matrix indicator (PMI1) value and a second precoder matrix indicator (PMI2) value based on the measured channel; and iii) transmitting the PMI2 value to the base station in the same subframe as a channel quality indicator (CQI) value.

A base station is provided for use in a wireless network capable of communicating with mobile stations. The base station is operable to receive feedback values transmitted by a mobile station. The feedback values including a first precoder matrix indicator (PMI1) value and a second precoder matrix indicator (PMI2) value. The base station receives the PMI2 value in the same subframe as a channel quality indicator (CQI) value.

A method is provided for use in a base station of a wireless network. The method receives feedback values transmitted by a mobile station. The feedback values including a first precoder matrix indicator (PMI1) value and a second precoder matrix indicator (PMI2) value. The method comprises the steps of: i) receiving a plurality of subframes transmitted by the mobile station; ii) identifying in a first subframe the PMI2 value; and iii) identifying in the first subframe a channel quality indicator (CQI) value.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7A and 7B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Figure 1:
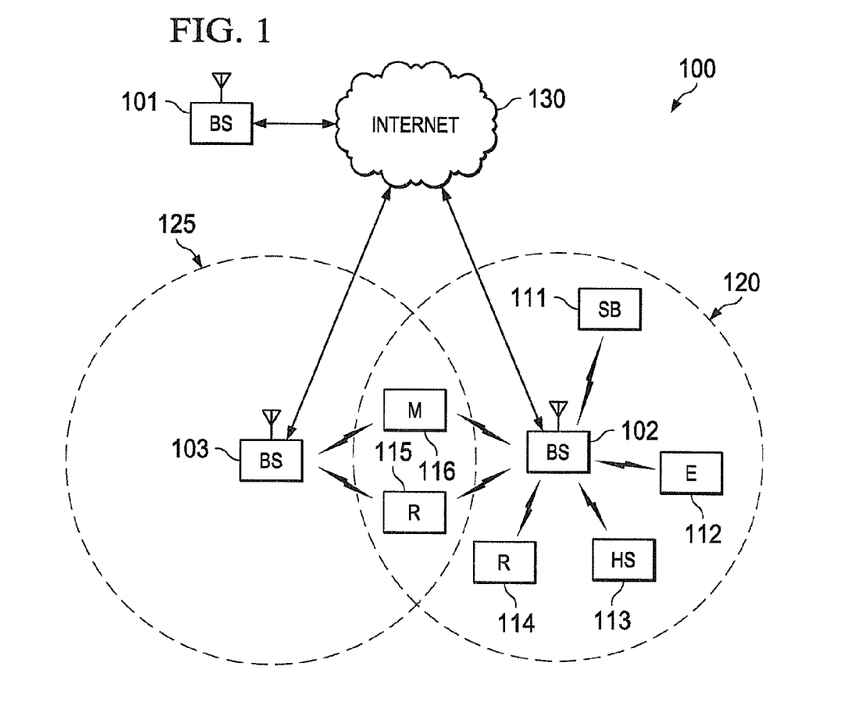
FIG. 1 illustrates an exemplary wireless network that performs feedback for the PUCCH and the PUSCH according to the principles of the present disclosure.

FIG. 1 illustrates exemplary wireless network 100, which performs feedback for the physical uplink control channel (PUCCH) and physical uplink shared channel (PUSCH) according to the principles of the present disclosure. In the illustrated embodiment, wireless network 100 includes base station (BS) 101, base station (BS) 102, base station (BS) 103, and other similar base stations (not shown). Base station 101 is in communication with Internet 130 or a similar IP-based network (not shown).

Depending on the network type, other well-known terms may be used instead of "base station," such as "eNodeB" or "access point". For the sake of convenience, the term "base station" shall be used herein to refer to the network infrastructure components that provide wireless access to remote terminals.

Base station 102 provides wireless broadband access to Internet 130 to a first plurality of mobile stations (or user equipment) within coverage area 120 of base station 102. The first plurality of mobile stations includes mobile station 111, which may be located in a small business (SB), mobile station 112, which may be located in an enterprise (E), mobile station 113, which may be located in a WiFi hotspot (HS), mobile station 114, which may be located in a first residence (R), mobile station 115, which may be located in a second residence (R), and mobile station 116, which may be a mobile device (M), such as a cell phone, a wireless laptop, a wireless PDA, or the like.

For sake of convenience, the term "mobile station" is used herein to designate any remote wireless equipment that wirelessly accesses a base station, whether or not the mobile station is a truly mobile device (e.g., cell phone) or is normally considered a stationary device (e.g., desktop personal computer, vending machine, etc.). Other well-known terms may be used instead of "mobile station", such as "subscriber station (SS)", "remote terminal (RT)", "wireless terminal (WT)", "user equipment (UE)", and the like.

Base station 103 provides wireless broadband access to Internet 130 to a second plurality of mobile stations within coverage area 125 of base station 103. The second plurality of mobile stations includes mobile station 115 and mobile station 116. In an exemplary embodiment, base stations 101-103 may communicate with each other and with mobile stations 111-116 using OFDM or OFDMA techniques.

While only six mobile stations are depicted in FIG. 1, it is understood that wireless network 100 may provide wireless broadband access to additional mobile stations. It is noted that mobile station 115 and mobile station 116 are located on the edges of both coverage area 120 and coverage area 125. Mobile station 115 and mobile station 116 each communicate with both base station 102 and base station 103 and may be said to be operating in handoff mode, as known to those of skill in the art.

Exemplary descriptions of closed-loop transmit beamforming schemes based on codebook design can be found in: 1) D. Love, J. Heath, and T. Strohmer, "Grassmannian Beamforming For Multiple-Input, Multiple-Output Wireless Systems," IEEE Transactions on Information Theory, October 2003, and 2) V. Raghavan, A. M. Sayeed, and N. Boston, "Near-Optimal Codebook Constructions For Limited Feedback Beamforming In Correlated MIMO Channels With Few Antennas," IEEE 2006 International Symposium on Information Theory. Both references are hereby incorporated by reference into this disclosure as if fully set forth herein.

Closed-loop, codebook-based, transmit beamforming may be used in a case where a base station forms a transmit antenna beam toward a single user or simultaneously toward multiple users at the same time and at a certain frequency. An exemplary description of such a system may be found in Quentin H. Spencer, Christian B. Peel, A. Lee Swindlehurst, Martin Harrdt, "An Introduction To the Multi-User MIMO Downlink," IEEE Communication Magazine, October 2004, which is hereby incorporated by reference into this disclosure as if fully set forth herein.

A codebook is a set of pre-determined antenna beams that are known to mobile stations. A codebook-based pre-coding MIMO may provide significant spectral efficiency gain in the downlink closed-loop MIMO. In the IEEE 802.16e and 3GPP Long-Term Evolution (LTE) standards, a four transmit (4-TX) antenna limited feedback based closed-loop MIMO configuration is supported. In IEEE 802.16m and 3GPP LTE Advanced (LTE-A) standards, in order to provide peak spectral efficiency, eight transmit (8-TX) antenna configurations are proposed as a prominent precoding closed-loop MIMO downlink system. Exemplary descriptions of such systems may be found in 3GPP Technical Specification No. 36.211, "Evolved Universal Terrestrial Radio Access (E-UTRA): Physical Channel and Modulation", which is hereby incorporated by reference into this disclosure as if fully set forth herein.

To eliminate the need for the phase calibration process in cases where channel sounding signals or common pilot signals (or midamble) are not used for data demodulation purpose, closed-loop transformed, codebook-based transmit beamforming may be utilized. An exemplary description of such a system may be found in IEEE C802.16m-08/1345r2, "Transformation Method For Codebook Based Precoding," November 2008, which is hereby incorporated by reference into this disclosure as if fully set forth herein. The transformed codebook method uses the channel correlation information to enhance the performance of the standard codebook, especially in highly correlated channels, as well as to eliminate the need of phase calibration among multiple transmit antennas. Typically, the channel correlation information is based on second-order statistics and thus changes very slowly, which is similar to long-term channel effects, such as shadowing and path loss. As a result, the feedback overhead and computational complexity associated with using correlation information are very small.

Figure 2:
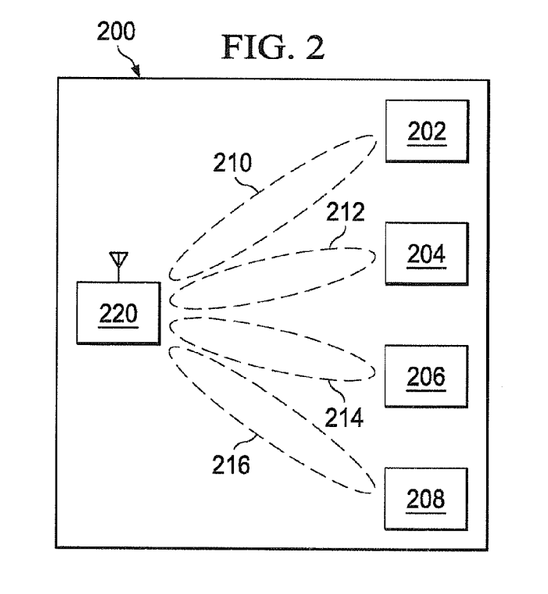
FIG. 2 illustrates a base station in communication with a plurality of mobile stations according to an embodiment of the disclosure.

FIG. 2 illustrates a diagram 200 of a base station 220 in communication with a plurality of mobile stations 202, 404, 406, and 408 according to an embodiment of this disclosure. In FIG. 2, base station 220 simultaneously communicates with multiple mobile stations using multiple antenna beams. Each antenna beam is formed toward an intended mobile station at the same time and using the same frequency. Base station 220 and mobile stations 202, 204, 206 and 208 employ multiple antennas for transmission and reception of radio frequency (RF) signals. In an advantageous embodiment, the RF signals may be Orthogonal Frequency Division Multiplexing (OFDM) signals.

Base station 220 performs simultaneous beamforming through a plurality of transmitters to each mobile station. For instance, base station 220 transmits data to mobile station 202 through a beamformed signal 210, data to mobile station 204 through a beamformed signal 212, data to mobile station 406 through a beamformed signal 214, and data to mobile station 408 through a beamformed signal 216. In some embodiments of the disclosure, base station 220 is capable of simultaneously beamforming to the mobile stations 202, 204, 206 and 208. In some embodiments, each beamformed signal is formed toward its intended mobile station at the same time and the same frequency. For the purpose of clarity, the communication from a base station to a mobile station may also be referred to as "downlink communication" and the communication from a mobile station to a base station may be referred to as "uplink communication".

Base station 220 and mobile stations 202, 204, 206 and 208 employ multiple antennas for transmitting and receiving wireless signals. It is understood that the wireless signals may be RF signals and may use any transmission scheme known to one skilled in the art, including an Orthogonal Frequency Division Multiplexing (OFDM) transmission scheme. Mobile stations 202, 204, 206 and 208 may be any device that is capable receiving wireless signals, such as the mobile stations in FIG. 1.

An OFDM transmission scheme is used to multiplex data in the frequency domain. Modulation symbols are carried on frequency sub-carriers. The quadrature amplitude modulated (QAM) symbols are serial-to-parallel converted and input to an Inverse Fast Fourier Transform (IFFT) processing block. At the output of the IFFT circuit, N time-domain samples are obtained. Here N refers to the size of the IFFT/FFT used by the OFDM system. The signal after IFFT is parallel-to-serial converted and a cyclic prefix (CP) is added to the signal sequence. A CP is added to each OFDM symbol to avoid or mitigate the impact due to multipath fading. The resulting sequence of samples is referred to as an OFDM symbol with a CP. On the receiver side, assuming that perfect time and frequency synchronization are achieved, the receiver first removes the CP, and the signal is serial-to-parallel converted before being input to a Fast Fourier Transform (FFT) processing block. The output of the FFT circuit is parallel-to-serial converted, and the resulting QAM symbols are input to a QAM demodulator.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Because each OFDM symbol has finite duration in the time domain, the sub-carriers overlap with each other in the frequency domain. However, the orthogonality is maintained at the sampling frequency assuming the transmitter and receiver have perfect frequency synchronization. In the case of frequency offset due to imperfect frequency synchronization or high mobility, the orthogonality of the sub-carriers at sampling frequencies is destroyed, resulting in inter-carrier interference (ICI).

The use of multiple transmit antennas and multiple receive antennas at both a base station and a single mobile station to improve the capacity and reliability of a wireless communication channel is known as a Single-User Multiple-Input, Multiple-Output (SU-MIMO) system. A MIMO system provides linear increase in capacity with K, where K is the minimum of number of transmit (M) and receive antennas (N) (i.e., K=min(M,N)). A MIMO system may be implemented with conventional schemes of spatial multiplexing, transmit/receive beamforming, or transmit/receive diversity.

Figure 3:
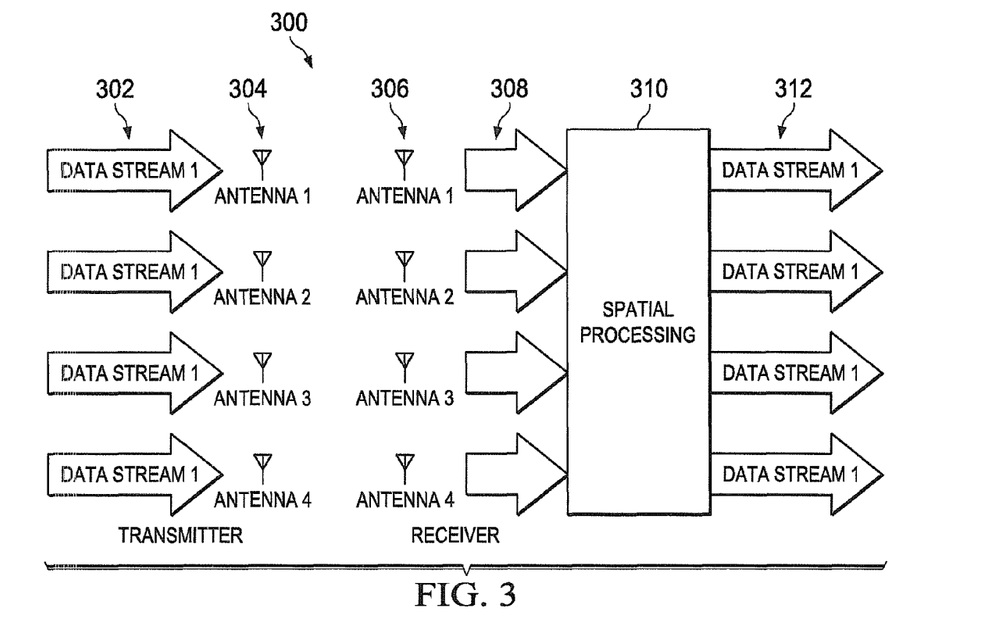
FIG. 3 illustrates a 4×4 multiple-input, multiple-output (MIMO) system according to an embodiment of the disclosure.

FIG. 3 illustrates a 4×4 multiple-input, multiple-output (MIMO) system 300 according to an embodiment of the present disclosure. In this example, four different data streams 302 are transmitted separately using four transmit antennas 304. The transmitted signals are received at four receive antennas 306 and interpreted as received signals 308. Some form of spatial signal processing 310 is performed on the received signals 308 in order to recover four data streams 312.

An example of spatial signal processing is Vertical-Bell Laboratories Layered Space-Time (V-BLAST), which uses the successive interference cancellation principle to recover the transmitted data streams. Other variants of MIMO schemes include schemes that perform some kind of space-time coding across the transmit antennas (e.g., Diagonal Bell Laboratories Layered Space-Time (D-BLAST)). In addition, MIMO can be implemented with a transmit-and-receive diversity scheme and a transmit-and-receive beamforming scheme to improve the link reliability or system capacity in wireless communication systems.

MIMO channel estimation consists of estimating the channel gain and phase information for links from each of the transmit antennas to each of the receive antennas. Therefore, the channel response, H, for N×M MIMO system consists of an N×M matrix, as shown below:

$$H = \begin{bmatrix} a_{11} & a_{12} & \cdots & a_{1M} \\ a_{21} & a_{22} & \cdots & a_{2M} \\ \vdots & \vdots & \cdots & \vdots \\ a_{N1} & a_{M2} & \cdots & a_{NM} \end{bmatrix}.$$

The MIMO channel response is represented by H and $a_{NM}$ represents the channel gain from transmit antenna N to receive antenna M. In order to enable the estimations of the elements of the MIMO channel matrix, separate pilots may be transmitted from each of the transmit antennas.

As an extension of single user MIMO (SU-MIMO), multi-user MIMO (MU-MIMO) is a communication scenario in which a base station with multiple transmit antennas can simultaneously communicate with multiple mobile stations through the use of multi-user beamforming schemes, such as Spatial Division Multiple Access (SDMA), to improve the capacity and reliability of a wireless communication channel.

In the present disclosure, two matrix indices specify a precoder. More specifically, a matrix index specifies W1∈C1 and a matrix index specifies W2∈C2, where C1 and C2 are two codebooks. The rank of the codeword W=W1×W2 (or W2×W1) is defined as the rank of W.

In Document No. R1-103333, "Refinements of Feedback And Codebook Design", incorporated by reference above, six (6) bits are needed to feed back a total of sixty-four (64) rank 1 precoders. More specifically, these 64 rank 1 precoders are generated using the method of:

$$W = \begin{bmatrix} \tilde{w} & 0 \\ 0 & \tilde{w} \end{bmatrix} \begin{bmatrix} 1 \\ \alpha \end{bmatrix}, \alpha \in \{1, -1, h, -j\}.$$

Since $\tilde{w}$ can have 16 different vector representations, in one embodiment, the payload size of the codebook for W1 (PMI1) may be 4 bits. Since α has four (4) different values (QPSK values), the payload size of the codebook for W2 (PMI2) may be two (2) bits. Therefore, altogether W has 64 different rank 1 beams and needs 6 bits to be specified.

Without loss of generality, the codeword W is denoted W1×W2, with W1 taking the form of:

$$\begin{bmatrix} \tilde{w} & 0 \\ 0 & \tilde{w} \end{bmatrix},$$

and W2 taking the form of:

$$\begin{bmatrix} 1 \\ \alpha \end{bmatrix}$$

for rank 1 precoders.

In this approach, effectively, the index of precoder matrix indicator 1 (PMI1) specifies a group of 8-Tx beams, while the index of precoder matrix indicator 2 (PMI2) selects a beam within the specified group of beams. It is noted that, in Document No. R1-103333, each group specified by PMI1 contains the same wideband beam and with 2 bits PMI2 only contains co-phase information of the wideband beam.

In Document No. R1-103805, "Double Codebook Performance Evaluation" and Document No. R1-103701, "8Tx Codebook Design", both incorporated by reference above, a codebook partition method is proposed. Basically, the PMI1 index specifies a group of 8-Tx beams, which contains multiple wideband beams. Furthermore, since the payload size of W1 is significantly smaller than the size of W1 proposed in Document No. R1-103333, Document Nos. R1-103805 and R1-103701 propose to perform joint coding of rank indicator (RI) and W1. More specifically, the 4-Tx beams are divided into different groups, with each group contains Nb beams. The PMI1 index indicates the group, while the PMI2 index indicates a particular 4-Tx beam in the selected group and indicates the co-phase between the 4-Tx beams to form 8-Tx beams.

The general concepts of dividing the total codewords (beams) into different subsets and joint coding the RI and subset index has been proposed in the previous disclosures. The present disclosure focuses on the signaling aspects of the feedback. In one embodiment of the disclosure, the PMI1 value is jointly encoded with the RI value, depending on the configured feedback mode.

By way of example, when a mobile station (MS) is configured in subband (SB) feedback mode (similar to PUCCH feedback mode 2-1), PMI1 is jointly coded with rank indicator (RI). More specifically, five (5) bit joint coding of RI and PMI1 is used. Alternatively, when the MS is configured in wideband (WB) feedback mode (similar to PUCCH feedback mode 1-1), PMI1 is not jointly encoded with rank indicator. More specifically, the payload for rank is three (3) bits, while the total payload for PMI1 and PMI2 is four (4) bits. In such a scenario, the RI value is transmitted together with PMI1 in the same subframe when the MS is configured in subband (SB) feedback mode, while RI and PMI1 are transmitted in different subframes when the mobile station is configured in wideband (WB) feedback mode. Detailed feedback configurations for PUCCH are shown in FIG. 5C.

In terms of transmitting PMI2, two alternatives are disclosed. In a first alternative, PMI2 and CQI (WB or SB) are always transmitted in the same subframe. In a second alternative, PMI2 is transmitted together with CQI only when the mobile station is configured in wideband feedback mode. In other words, PMI2 and CQI are transmitted in different subframes when the mobile station is configured in the subband feedback mode.

Figure 4A:
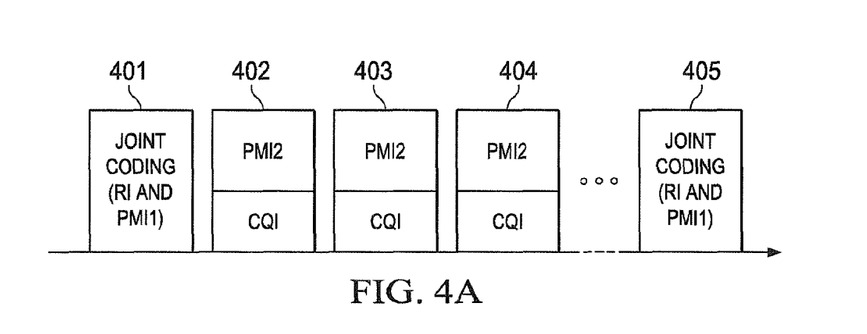
FIGS. 4A and 4B illustrate the signaling for physical uplink control channel (PUCCH) feedback for Release 10 according to exemplary embodiments of the disclosure.
Figure 4B:
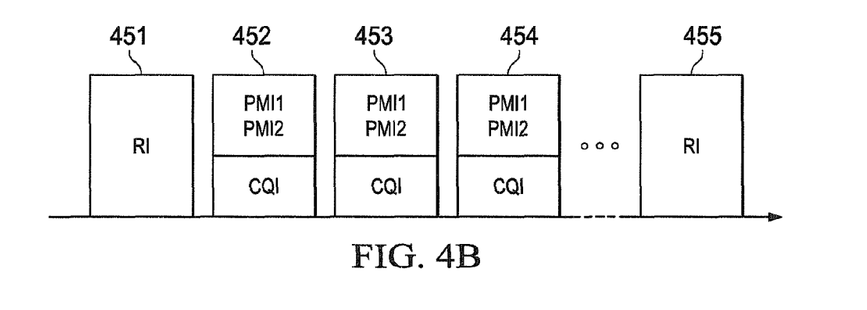

FIGS. 4A and 4B illustrate the signaling for physical uplink control channel (PUCCH) feedback for Release 10 according to exemplary embodiments of the disclosure. FIGS. 4A and 4B illustrate the first alternative described above (i.e., PMI2 and CQI (WB or SB) are always transmitted in the same subframe). In FIG. 4A, subframes 401-405 are transmitted by a mobile station for CSI feedback mode targeting subband (SB) feedback. Each one of subframe (SF) 401 and SF 405 transmits jointly-coded rank indicator (RI) feedback and precoding matrix indicator 1 (PMI1) feedback. Each one of SF 402, SF 403, and SF 404 transmits both CQI and PMI2 feedback for subband feedback.

In FIG. 4B, subframes 451-455 are transmitted by a mobile station for CSI feedback mode targeting wideband (WB) feedback. Each one of subframe (SF) 451 and SF 455 transmits rank indicator (RI) feedback. Each one of SF 452, SF 453, and SF 454 transmits CQI feedback, PMI1 feedback, and PMI2 feedback for wideband feedback.

In FIGS. 4A and 4B, the RI value is separately sent from PMI1 and PMI2 (even if jointly encoded). However, in an advantageous embodiment of the present disclosure, the mobile station may transmit a group index, as proposed in U.S. patent application Ser. No. 13/104,644, instead of rank indicator. The disclosure of U.S. patent application Ser. No. 13/104,644 is hereby incorporated by reference into the present disclosure as if fully set forth herein. In the present case, the group is defined to group the codewords into different groups.

In the feedback modes shown in FIGS. 4A and 4B, it is proposed that PMI2 may be sent together with wideband (WB) CQI and/or subband (SB) CQI, depending on the feedback mode. More specifically, in a first alternative, in the CSI feedback mode targeting SB feedback, the CQI value sent together with PMI2 may be either WB CQI or SB CQI. In a second alternative, in the CSI feedback mode targeting WB feedback, the CQI value sent together with PMI2 can only be WB CQI.

Figure 5A:
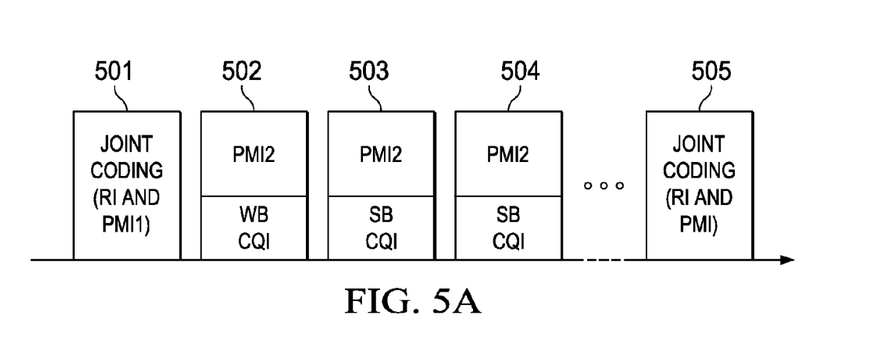
FIGS. 5A and 5B illustrate in greater detail the CSI feedback mode targeting SB feedback according to an advantageous embodiment of the present invention.
Figure 5B:
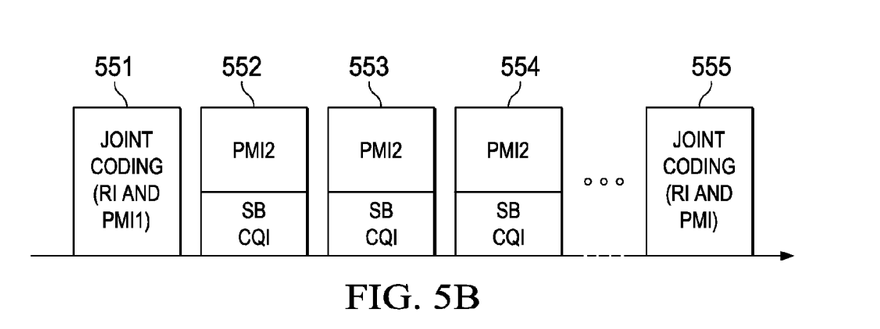
Figure 5C:
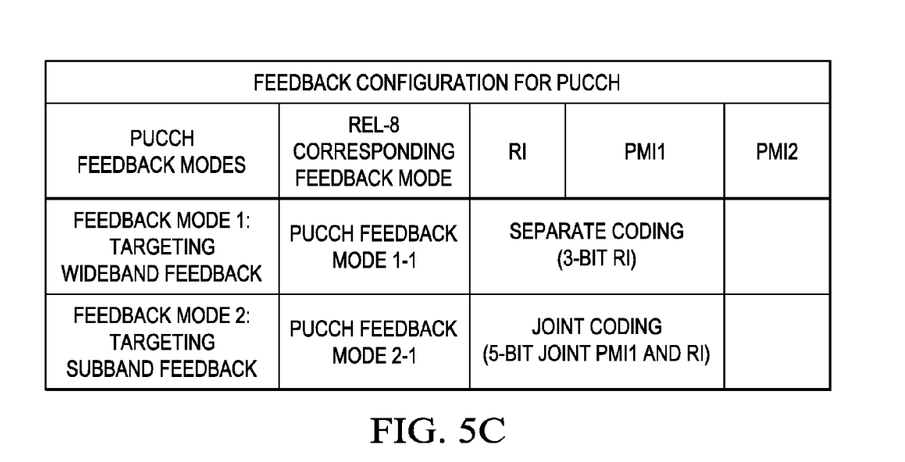
FIG. 5C illustrates feedback configurations for PUCCH according to the principles of the present disclosure.

FIGS. 5A and 5B illustrate in greater detail the CSI feedback mode targeting SB feedback according to an advantageous embodiment of the present invention. FIGS. 5A and 5B illustrate the first alternative described above (i.e., the CQI value sent together with PMI2 may be either WB CQI or SB CQI).

In FIG. 5A, subframes 501-505 are transmitted by a mobile station for CSI feedback mode targeting subband (SB) feedback according to one embodiment. Each one of subframe (SF) 501 and SF 505 transmits jointly-coded rank indicator (RI) feedback and precoding matrix indicator 1 (PMI1) feedback. SF 502 transmits both wideband (WB) CQI and PMI2 feedback for subband (SB) feedback. Each of SF 503 and SF 504 transmits both subband (SE) CQI and PMI2 feedback for subband (SB) feedback.

In FIG. 5B, subframes 551-555 are transmitted by a mobile station for CSI feedback mode targeting subband (SB) feedback according to another embodiment. Each one of subframe (SF) 551 and SF 555 transmits jointly-coded rank indicator (RI) feedback and precoding matrix indicator 1 (PMI1) feedback. Each one of SF 552, SF 553, and SF 554 transmits both subband (SB) CQI and PMI2 feedback for subband (SE) feedback.

In one embodiment of the disclosure, the number of subband reports for PMI2 varies as the states of the joint coding of RI and PMI1 changes. The purpose of this embodiment is to take advantage of the different payload sizes for PMI2 under different states of the joint coding of RI and PMI1. Since a higher rank codeword contains a greater number of precoding directions (i.e., preceding beams), it follows that the payload size for PMI2 for a higher rank (e.g., rank greater than 4) is smaller as a result. For example, the payload size for PMI2 for rank higher than 4 may be only one (1) bit while the payload size for PMI2 for rank less or equal to 4, may be two (2) bits or more. In such a scenario, there are two possible ways to utilize the available payload for feedback subband PMI2.

In a first alternative (ALT1), in the subframe where the mobile station (MS) is configured to feedback subband PMI2/CQI, the number of subbands in which the MS is configured to perform subband feedback in one feedback subframe may be increased. In other words, the frequency coverage of the subband feedback changes as a function of rank, the configured feedback bandwidth, and the total system bandwidth.

In a second alternative (ALT2), in the subframe where the MS is configured to feedback subband PMI2/CQI, the feedback granularity of subband feedback may be increased up to 1 physical resource block (PRB). In other words, the feedback granularity of the subband feedback is a function of rank.

Figure 6A:
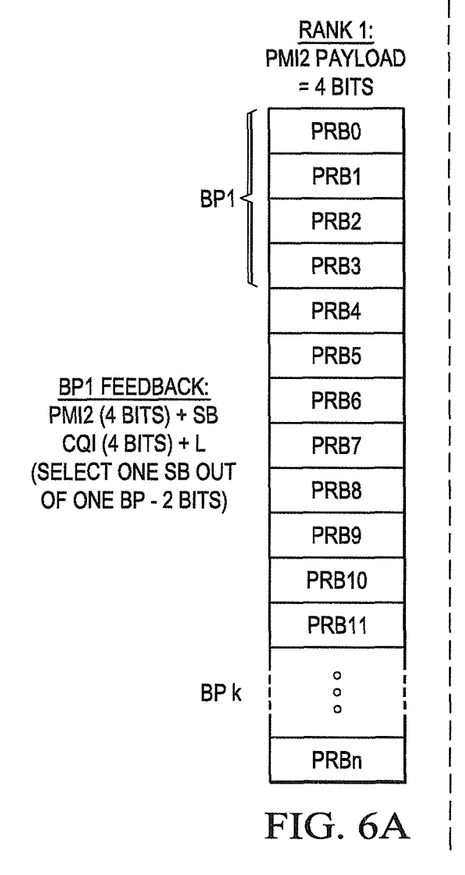
FIGS. 6A and 6B illustrate feedback subbands in Release 10 according to an exemplary embodiment of the disclosure.
Figure 6B:
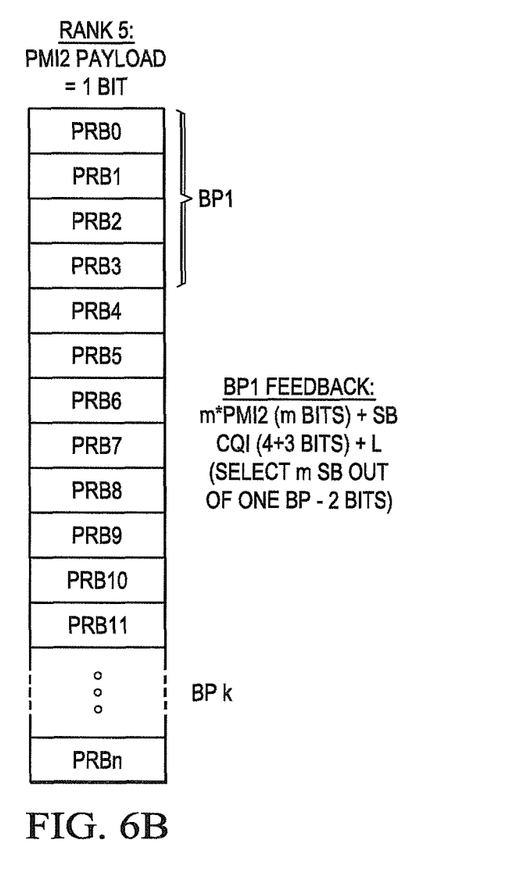

FIGS. 6A and 6B illustrate feedback subbands in Release 10 according to an exemplary embodiment of the disclosure. FIGS. 6A and 6B illustrates the first alternative (ALT1) described above (i.e., the number of subbands in which the MS is configured to perform subband feedback in one feedback subframe may be increased).

In FIG. 6A, for rank 1, the mobile station feeds back one subband (SB) out of $N_j$ subbands within a bandwidth part (BP1) and sends the corresponding PMI2 and SB CQI. The bandwidth part BP1 comprises physical resource blocks PRB0-PRB3. In FIG. 6B, for rank 5, the mobile station feeds back m subbands (SB) out of $N_j$ subbands within the same bandwidth part (BP) and sends the corresponding PMI2 and SB CQI values (including CQI and differential CQI). The value of m depends on the total number of subbands within the bandwidth part BP1 and the payload size of PMI2. However since the payload size of PMI2 depends on the rank, the value m actually depends on the rank of the codeword. It is noted that the feedback subband size depends only on the total system bandwidth and is not a function of the payload size of PMI2.

Figure 7A:
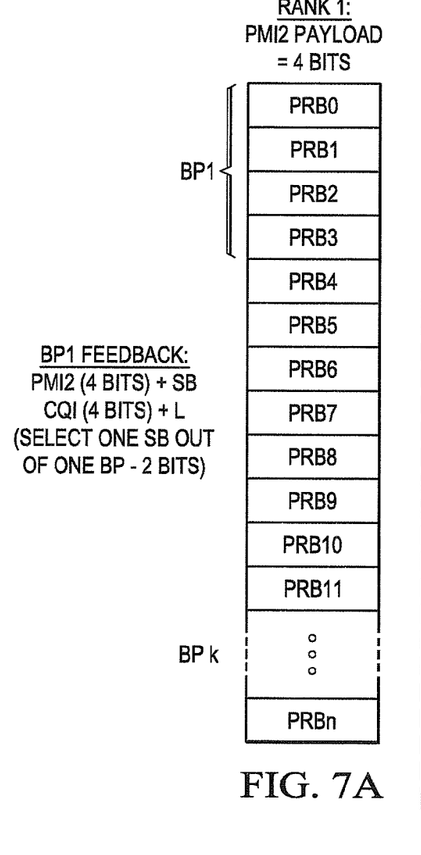
FIGS. 7A and 7B illustrate feedback subbands in Release 10 according to another exemplary embodiment of the disclosure.
Figure 7B:
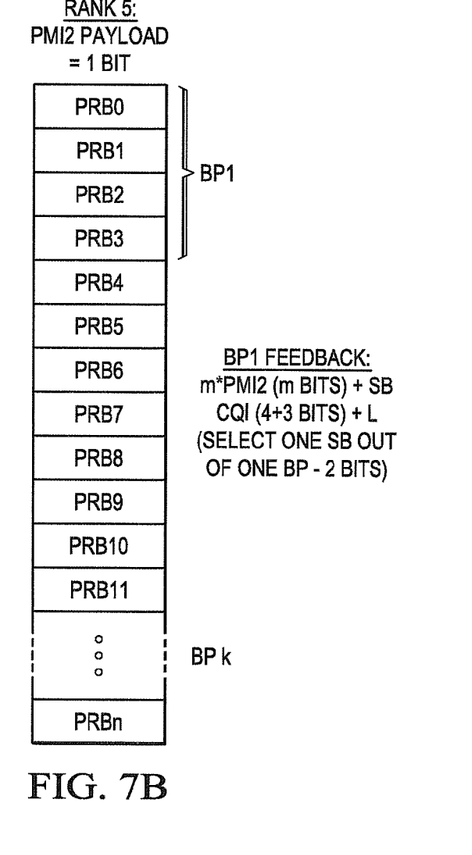

FIGS. 7A and 7B illustrate feedback subbands in Release 10 according to another exemplary embodiment of the disclosure. FIGS. 7A and 7B illustrates the second alternative (ALT2) described above (i.e., the feedback granularity of subband feedback may be increased up to 1 physical resource block (PRB)).

In FIG. 7A, for rank 1, the mobile station (MS) feeds back one subband (SB) out of $N_j$ subbands within a bandwidth part (BP) and transmits the corresponding PMI2 and SB CQI. In FIG. 7B, for rank 5, the MS feeds back one (1) subband (SB) out of $N_j$ subbands within a bandwidth part (BP1) and transmits the corresponding PMI2 and SB CQI (including CQI and differential CQI). However, within a subband, the mobile station is configured to send the value of m bits of PMI2 (instead of 1 bit of PMI2), with each bit representing a component subband PMI2. The granularity of the subband depends on the payload of PMI2 and may be at most 1 PRB. The value of m depends on the size of a subband and the payload size of PMI2. However, since the payload size of PMI2 depends on the rank, the value m actually depends on the rank of the codeword.

In one embodiment of the disclosure, the following construction may be used for the rank 1 and rank 2 8-Tx codewords.

In PUCCH subband feedback mode and PUSCH feedback, the 4-Tx beams are divided into different groups. It is noted that the 4-Tx beams include both 16 DFT beams and non-DFT beams. Let $N_T$ stand for the total number of 4-Tx beams and let $N_g$ stand for the total number of groups into which the 4-Tx beams are divided, with each group containing $N_b$ beams. Then, PMI1 is indexed from 0 to ($N_b$−1). It is proposed that the $N_g$ and $N_b$ are a function of the rank of the codewords.

For example, there may be a total of 24 4-Tx beams, including 16 DFT beams and 8 non-DFT beams, as defined in the Rel-8 4-Tx codebook (see 3GPP Technical Specification No. 36.211, incorporated by reference above). In rank 1/2, these beams are indexed from 0 to 23 and are divided into 8 groups, with each group containing 4 beams (i.e., $N_g$=8 and $N_b$=4). This gives: i) 8 Groups for PMI1: {0, 1, 2, 3}, {3, 4, 5, 6}, {6, 7, 8, 9}, ..., {20, 21, 22, 23}; ii) 16 selection for PMI2 (rank 1): 4 selections within the group, 4 selection among the co-phasing; and iii) 8 selection for PMI2 (rank 2): 4 selections within the group, 4 selections among co-phasing.

For another example, let $N_g$=12 and let $N_b$=4 for rank 1 and rank 2 codebooks. This gives: i) 12 Groups for PMI1: {0, 1, 2, 3}, {2, 3, 4, 5}, {4, 5, 6, 7}, ..., {22, 23, 0, 1}; ii) 16 selections for PMI2 (rank 1): 4 selections within the group, 4 selection among the co-phasing; and iii) 8 selections for PMI2 (rank 2): 4 selections within the group, 4 selections among co-phasing.

For another example, let there be a total of 32 4-Tx beams with 16 DFT beams and 16 non-DFT beams. In rank 1/2, these beams are indexed from 0 to 23 and are divided into 8 groups with each group containing 4 beams (i.e., $N_g$=8 and $N_b$=4). This gives: i) 8 Groups for PMI1: {0, 1, 2, 3}, {4, 5, 6, 7}, {8, 9, 10, 11}, ..., {28, 29, 30, 31}; ii) 16 selections for PMI2 (rank 1): 4 selections within the group, 4 selections among the co-phasing; and iii) 8 selection for PMI2 (rank 2): 4 selections within the group, 4 selections among co-phasing.

In the feedback mode when PMI1 and PMI2 are sent in the same subframe, several alternate embodiments may be implemented. In a first alternative (ALT1), a codebook subset restriction is applied to PMI1 and/or PMI2. The rule of the codebook subset restriction depends on the rank and rank-set, similar to what is disclosed in Application Serial No. 13/104,644, incorporated by reference above.

For example, there may be four (4) groups, as follows: i) Group 1: rank 1 codewords; ii) Group 2: rank 2 codewords; iii) Group 3: rank 3 codewords; and iv) Group 4: codewords for rank 4 and above. Furthermore, there may be rank-dependent subset restriction. That is, the payload of PMI1 and PMI2 depends on the rank of the codewords.

In a second alternative (ALT2), codebook subset restriction may be applied by grouping only. That is, the total codewords are partitioned into different groups and the grouping index is transmitted in a lower-frequency PUCCH or a mobile station RRC message or a base station RRC configuration.

IN a third alternative (ALT3), ALT1 and ALT2 may both be applied. That is, the codewords are first grouped into different groups and the group index is signaled using ALT2. Based on the group, index, different codebook subset restrictions are applied. It is noted that ALT1 is a special case of ALT3, where there is only one group within each rank/rank-set.

In one embodiment of the disclosure, the following description of grouping may apply: i) grouping may be based on rank; and ii) several ranks may be lumped into one group. For example, codewords are grouped into 4 groups: R1, R2, R3, and R4-R8. Grouping may be based on rank and other criteria, such as beam directions. That is, groups can be created within one rank, where the number of groups for each rank may vary.

In another example, a total of 8 groups may be created, where rank 1 codewords are partitioned into 3 groups and rank 2/3 codewords are partitioned into 2 groups, while rank 4 and above codewords are lumped to one group. The Group ID may be fed-back with slow-rate or may be RRC configured.

In another embodiment of the disclosure, codebook subset restrictions may be applied when the MS is configured only in the wideband (WB) feedback mode. Furthermore, the codebook subset restriction may be on PMI1 and/or PMI2. Assuming the feedback configuration for PUCCH subband feedback and PUCCH feedback as described in the previous embodiment, the following method for codebook subset restriction for PUCCH wideband feedback may be applied.

In a first alternative, subset restriction is only applied on PMI2. This keeps the payload of PMI1 at 3 bits, reducing the payload of PMI2 to 1 bit. For example, PMI2 selects among the first two beams within each group specified by PMI1.

In a second alternative, subset restriction is applied on both PMI1 and PMI2. This reduces the payload of PMI1 to 2 bits and reducing the payload of PMI2 to 1 bit.

For example, assuming $N_T$=24, $N_g$=8, and $N_b$=4, then there may be: i) 4 Groups for PMI1: {0, 1, 2, 3}, {6, 7, 8, 9}, ..., {18, 19, 20, 21}; ii) 4 selections for PMI2 (rank 1): selection among all four indices within each group; and iii) 4 selection for PMI2 (rank 2): selection among all four indices within each group.

For another example, there may be: i) 4 selections for PMI2 (rank 1): selection among all first and third indices within each group+2 QPSK co-phase selection; and ii) 4 selections for PMI2 (rank 2): selection among all first and third indices within each group+2 QPSK co-phase selection—or the combination of the listed rank 1 and rank 2 schemes.

In a third alternative, subset restriction may be applied on both PMI1 and PMI2. This reduces the payload of PMI1 to 1 bit and reduces the payload of PMI2 to 3 bit.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless network, a mobile station operable to transmit feedback values to a base station of the wireless network, the feedback values including a first precoder matrix indicator (PMI1) value and a second precoder matrix indicator (PMI2) value associated with a common channel quality indicator (CQI) value, wherein the mobile station transmits the PMI2 value to the base station in the same subframe as the CQI value.

2. The mobile station as set forth in claim 1, wherein the CQI value is a wideband CQI value.

3. The mobile station as set forth in claim 1, wherein the CQI value is a subband CQI value.

4. A method for use in a mobile station that transmits feedback values to a base station of a wireless network, the method comprising:

> measuring a channel between the base station and the mobile station;
>
> determining feedback values including a first precoder matrix indicator (PMI1) value and a second precoder matrix indicator (PMI2) value associated with a common channel quality indicator (CQI) value based on the measured channel;
>
> transmitting the PMI2 value to the base station in the same subframe as the CQI value.

5. The method as set forth in claim 4, wherein the CQI value is a wideband CQI value.

6. The method as set forth in claim 4, wherein the CQI value is a subband CQI value.

7. For use in a wireless network, a base station operable to receive feedback values transmitted by a mobile station, the feedback values including a first precoder matrix indicator (PMI1) value and a second precoder matrix indicator (PMI2) value associated with a common channel quality indicator (CQI) value, wherein the base station receives the PMI2 value in the same subframe as the CQI value.

8. The base station as set forth in claim 7, wherein the CQI value is a wideband CQI value.

9. The base station as set forth in claim 7, wherein the CQI value is a subband CQI value.

10. For use in a base station of a wireless network, a method of receiving feedback values transmitted by a mobile station, the feedback values including a first precoder matrix indicator (PMI1) value and a second precoder matrix indicator (PMI2) value associated with a common channel quality indicator (CQI) value, the method comprising the steps of:

> receiving a plurality of subframes transmitted by the mobile station;
>
> identifying in a first subframe the PMI2 value; and
>
> identifying in the first subframe the CQI value.

11. The method as set forth in claim 10, wherein the CQI value is a wideband CQI value.

12. The method as set forth in claim 10, wherein the CQI value is a subband CQI value.

\* \* \* \* \*